United States Patent [19]

Kowalski et al.

[11] Patent Number: 5,117,648

[45] Date of Patent: Jun. 2, 1992

[54] REFRIGERATION SYSTEM WITH EJECTOR AND WORKING FLUID STORAGE

[75] Inventors: Gregory J. Kowalski, Beverly; Arthur R. Foster, Braintree, both of Mass.

[73] Assignee: Northeastern University, Boston, Mass.

[21] Appl. No.: 598,141

[22] Filed: Oct. 16, 1990

[51] Int. Cl.⁵ .......................................... F25B 27/00
[52] U.S. Cl. .................... 62/238.6; 62/323.1; 62/500
[58] Field of Search .......... 62/238.6, 500, 191, 62/238.4, 323.1, 323.2, 239; 165/104.26, 907

[56] References Cited

U.S. PATENT DOCUMENTS

| | | | |
|---|---|---|---|
| 2,062,651 | 12/1936 | Hennig | 62/115 |
| 2,327,451 | 8/1943 | Perrine | 257/7 |
| 2,353,966 | 7/1944 | Newcombe | 123/174 |
| 2,360,969 | 10/1944 | Newcombe | 60/11 |
| 2,404,778 | 7/1946 | Allison | 204/314 |
| 2,683,971 | 7/1954 | Neumann | 62/191 |
| 3,470,707 | 10/1969 | Lofgreen | 62/196 |
| 3,500,897 | 3/1970 | von Cube | 165/26 |
| 3,670,519 | 6/1972 | Newton | 62/116 |
| 3,701,264 | 10/1972 | Newton | 62/191 |
| 3,888,090 | 6/1975 | Meyer | 62/240 |
| 3,922,877 | 12/1975 | Ophir | 62/238 |
| 3,945,216 | 3/1976 | Schibbye | 62/84 |
| 4,006,602 | 2/1977 | Fanberg | 62/113 |
| 4,023,948 | 5/1977 | Pitts | 62/191 |
| 4,037,649 | 7/1977 | Hartka | 165/16 |
| 4,094,170 | 6/1978 | Kantor | 62/500 |
| 4,127,993 | 12/1978 | Phillips | 62/101 |
| 4,164,850 | 8/1979 | Lowi | 62/196 |
| 4,169,361 | 10/1979 | Baldus | 62/402 |
| 4,250,715 | 2/1981 | Ratliff | 62/175 |
| 4,307,575 | 12/1981 | Frosch | 62/148 |
| 4,309,877 | 1/1982 | Tawse | 62/238.1 |
| 4,313,307 | 2/1982 | Sisk | 62/79 |
| 4,319,462 | 3/1982 | Foster | 62/235 |
| 4,342,200 | 8/1982 | Lowi | 62/191 |
| 4,384,608 | 5/1983 | Scarlett | 165/43 |
| 4,431,557 | 2/1984 | Schimizu | 252/52 A |
| 4,441,332 | 4/1984 | Wilkinson | 62/238.3 |
| 4,448,347 | 5/1984 | Dunstan | 237/2 B |
| 4,523,437 | 6/1985 | Briley | 62/238.4 |
| 4,557,677 | 12/1985 | Hasegawa | 418/63 |
| 4,567,733 | 2/1986 | Mecozzi | 62/175 |
| 4,574,874 | 3/1986 | Duran | 165/43 |
| 4,612,782 | 9/1986 | Urch | 62/500 |
| 4,688,394 | 8/1987 | Waldorf | 62/243 |
| 4,690,209 | 9/1987 | Martin | 165/150 |
| 4,691,532 | 9/1987 | Reid | 62/476 |
| 4,742,687 | 5/1988 | Reid | 62/112 |
| 4,742,693 | 5/1988 | Reid | 62/476 |
| 4,748,826 | 6/1988 | Laumen | 62/500 |
| 4,770,606 | 9/1988 | Kuroiwa | 415/199.1 |
| 4,787,444 | 11/1988 | Countryman | 165/48.2 |
| 4,817,395 | 4/1989 | Martinez | 62/175 |
| 4,864,831 | 9/1989 | Hino | 62/123 |

Primary Examiner—Albert J. Makay
Assistant Examiner—John Sollecito
Attorney, Agent, or Firm—Weingarten, Schurgin, Gagnebin & Hayes

[57] ABSTRACT

A refrigeration system particularly suitable for an automobile air conditioning system is disclosed. The refrigeration system uses a hydrocarbon as the working fluid. The system includes an ejector in the refrigeration cycle and a boiler which utilizes waste heat from the automobile engine. A refrigerant storage subsystem may be included in the system to provide an adequate transient response to changes in the waste heat output from the automobile engine and during the engine warm up period.

3 Claims, 4 Drawing Sheets

LEGEND { CV1 = CONTROL VALVE 1
CV2 = CONTROL VALVE 2
EV1 = EXPANSION VALVE 1 }

REFRIGERATION SYSTEM WITH EJECTOR AND WORKING FLUID STORAGE

FIELD OF THE INVENTION

This invention relates to the field of refrigeration and more particularly to automotive air conditioning systems.

BACKGROUND OF THE INVENTION

In the basic vapor-compression refrigeration cycle, the temperature of a working fluid, or refrigerant, is reduced below the environmental temperature by an expansion process. Energy is then transferred as heat from the space to be cooled to the working fluid in an evaporator. To reuse the refrigerant, it is repressurized to raise its temperature above the environmental temperature. Heat is then transferred from the refrigerant to the environment in a condenser. The cycle then repeats.

Chloroflourocarbons (CFCs) are often used as the working fluid in vapor-compression refrigeration systems. However, in recent years, CFC pollution and particularly the destructive effect of CFCs on the earth's ozone layer have become of increasing concern. A major source of CFC pollution is the automobile air conditioning system, which typically uses the CFC freon as the working fluid. The CFCs are prone to leak out of the air conditioner both during the useful life of the air conditioner and when the vehicle is discarded. The state of Vermont and cities in California have even banned the use of automobile air conditioners which use CFCs as the working fluids.

Refrigerant systems have been devised in which the refrigerant is water and which use a steam ejector rather than a compressor in the cooling cycle. Railroad passenger cars were cooled with a steam ejector system during the era of steam locomotion. This system was practical at the time, since there was a ready source of high pressure steam and the size of the system was not critical. The steam ejector system was replaced by other types of air conditioning systems when diesel locomotives replaced steam locomotives.

In the 1970s, a solar powered refrigeration system was proposed and analyzed, although never constructed. In this system, solar energy was used to boil a working fluid. The output from the boiler was a high velocity vapor which entered an ejector system. Water was found to be the working fluid that gave the highest coefficient of performance.

Water has several disadvantages as a working fluid, however, particularly for use in automobiles. Water is liable to freeze in winter in temperate climates, causing damage to the system. Also, water systems require a low operating pressure in the evaporator and must be fairly large, so that they are difficult to fit into small vehicles.

Ejector refrigeration systems powered by automobile engine waste heat have been used. However, these prior art systems use a CFC refrigerant and do not account for the problems in the transient response characteristics of the ejector system due to fluctuations in the waste heat output of the engine, such as during engine start-up.

SUMMARY OF THE INVENTION

The refrigeration system of the present invention uses a hydrocarbon, such as isopentane, butane, or pentane, as the working fluid, rather than a CFC. The energy input to the working fluid may be the waste heat, such as from the coolant or exhaust gas of an automobile engine, which is used to evaporate the working fluid in a boiler. The boiler produces a near sonic saturated vapor which enters an ejector.

The ejector replaces the compressor in the traditional vapor-compression air conditioning system. In the ejector, the fluid from the evaporator, the secondary fluid, is pulled into the ejector and entrained into the fluid from the boiler, the primary fluid. The enthalpy of the primary fluid from the boiler is converted into kinetic energy which is used to increase the pressure of the entrained secondary fluid. The ejector includes a converging-diverging nozzle through which the primary working fluid travels, a mixing region where the primary and secondary fluids are mixed, and a diffuser. At the exit of the converging-diverging nozzle, the primary working fluid is traveling at a supersonic velocity and at a low pressure. The pressure at this location is equal to or slightly lower than the saturation pressure of the working fluid at the desired evaporator temperature. The primary and secondary flows mix in the mixing section and their pressures are increased through a standing shock wave at the entrance to the diffuser. The pressure of the working fluid is further increased as it flows through the diffuser. The exit pressure of the diffuser equals the saturation pressure at the condenser design temperature.

The high pressure fluid enters the condenser where heat is transferred to the environment and the vapor is condensed to a saturated liquid. The saturated liquid is then divided into two flows. One flow passes through an expansion valve and returns to the evaporator. The second flow is pumped to a higher pressure and returns to the boiler. The magnitude of the pump work is a negligible fraction of the cooling effect of the system since it involves pumping a liquid.

The system includes a refrigerant storage subsystem to provide an adequate transient response to variations in the heat source, such as, for example, during warm up of an automobile engine or idling at a stop light.

DESCRIPTION OF THE DRAWINGS

The invention will be more fully understood from the following detailed description taken in conjunction with the accompanying drawings in which.

DETAILED DESCRIPTION OF THE INVENTION

Figure 1:
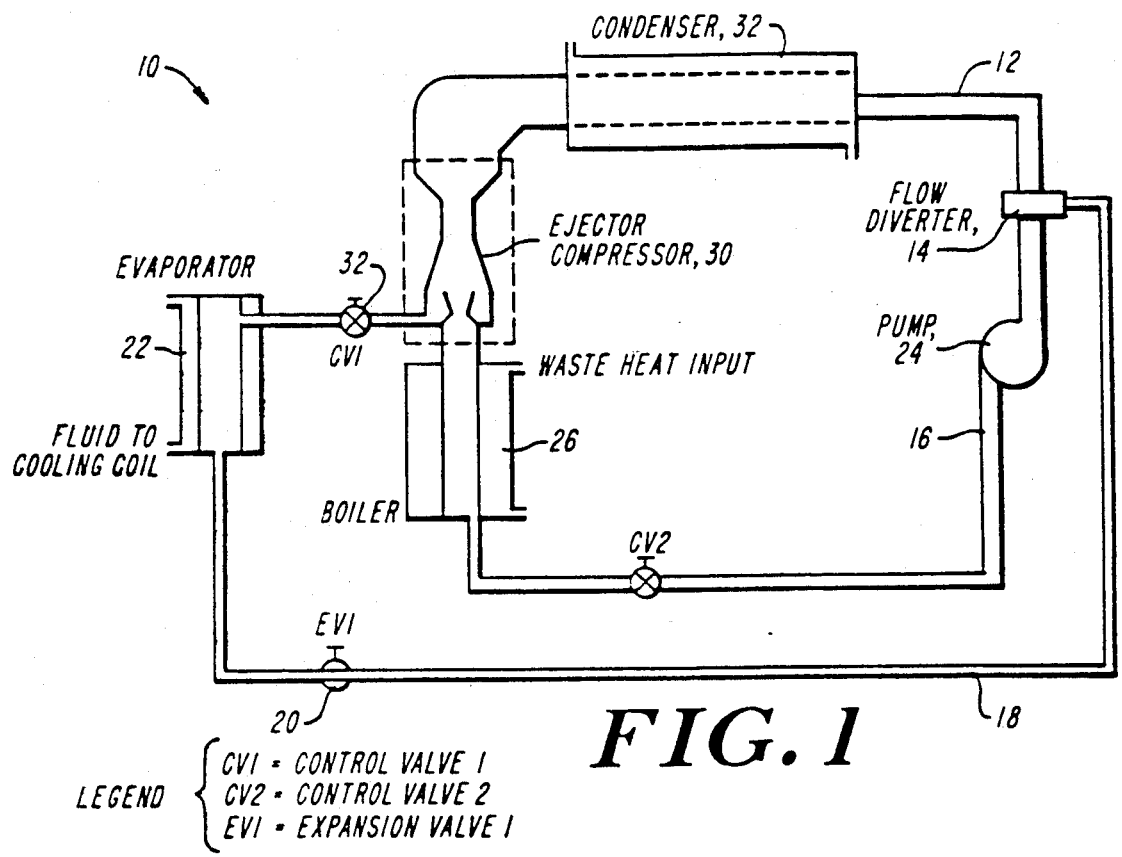
FIG. 1 is a schematic diagram of the refrigeration system of the present invention.

The cooling system of the present invention is shown generally at 10 in FIG. 1. The cycle comprises a first section 12 of a fluid flow path and a flow diverter 14 which diverts fluid flow on the path 12 into second and third sections 16, 18 of the fluid flow path.

An expansion valve 20 and evaporator 22 are located on the third path section 18. A pump 24 and boiler 26 are located on the second path section 16. An ejector 30 is located at the outputs of the evaporator 22 and boiler 26. A condenser 32 is located at the output of the ejector 30 on the first path section 12.

A refrigerant fluid travels around the circuit shown in FIG. 1. The fluid exits the condenser 32 as a saturated liquid. It enters the flow diverter 14 and is diverted into the second and third flow paths 16,18. The fluid on the third path 18 passes through the expansion valve 20, where its temperature is decreased to some point slightly below the design temperature of the evaporator. The fluid then enters the evaporator 22. A cooling fluid, such as a water-ethylene glycol mixture, from the cooling coil passes around the working fluid. Since the temperature of the working fluid is below the environmental temperature, heat is transferred from the cooling fluid to the working fluid, thereby cooling the cooling fluid. The cooling fluid returns to the cooling coil to cool the space to be refrigerated, such as the passenger compartment of an automobile. The heated refrigerant from the evaporator then passes through control valve 32 and enters the ejector 30.

The fluid on path 16 from the flow diverter 14 is pumped by the pump 24 to the boiler 26. The fluid being pumped by the pump 24 is always a liquid, which is significantly easier to pump than a vapor and accordingly reduces the pump work requirement of the system.

Figure 4:
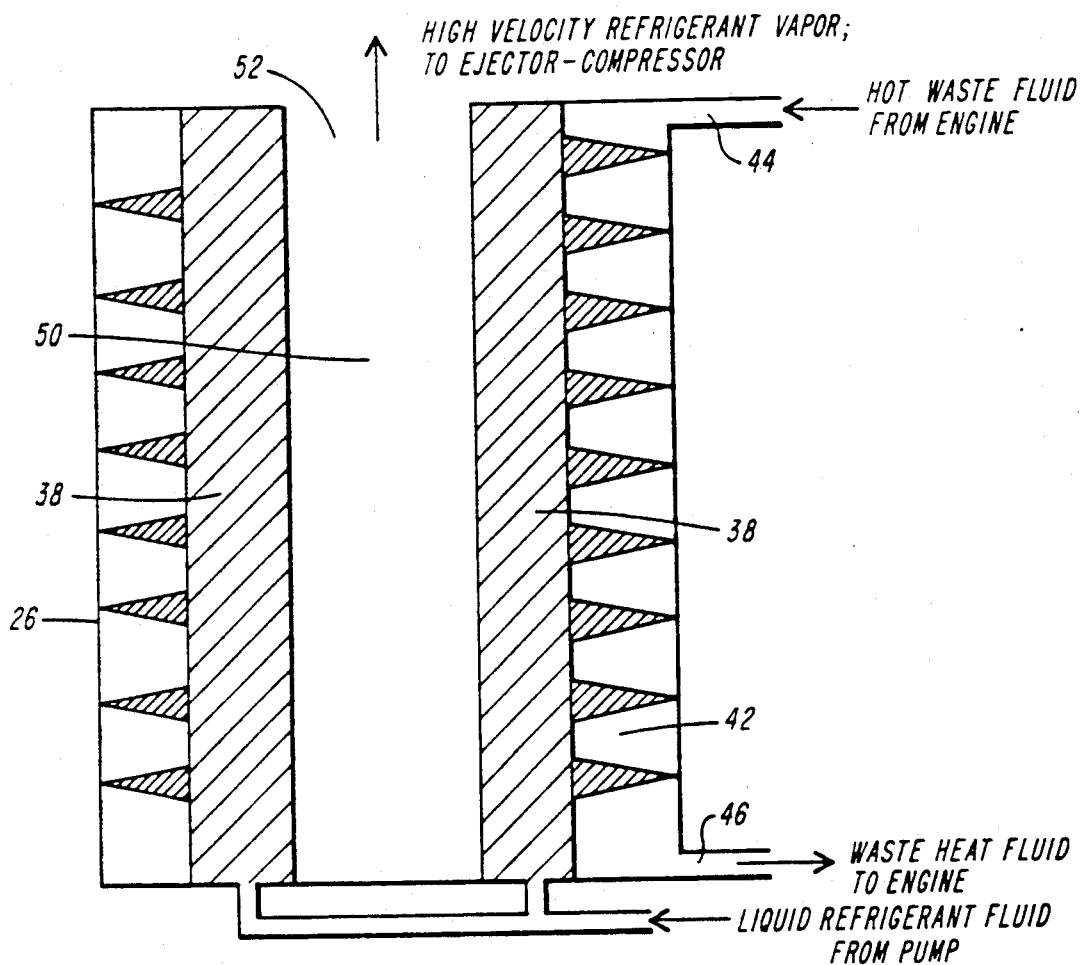
FIG. 4 is a schematic cross-sectional view of a boiler for use in the present invention.
Figure 5:
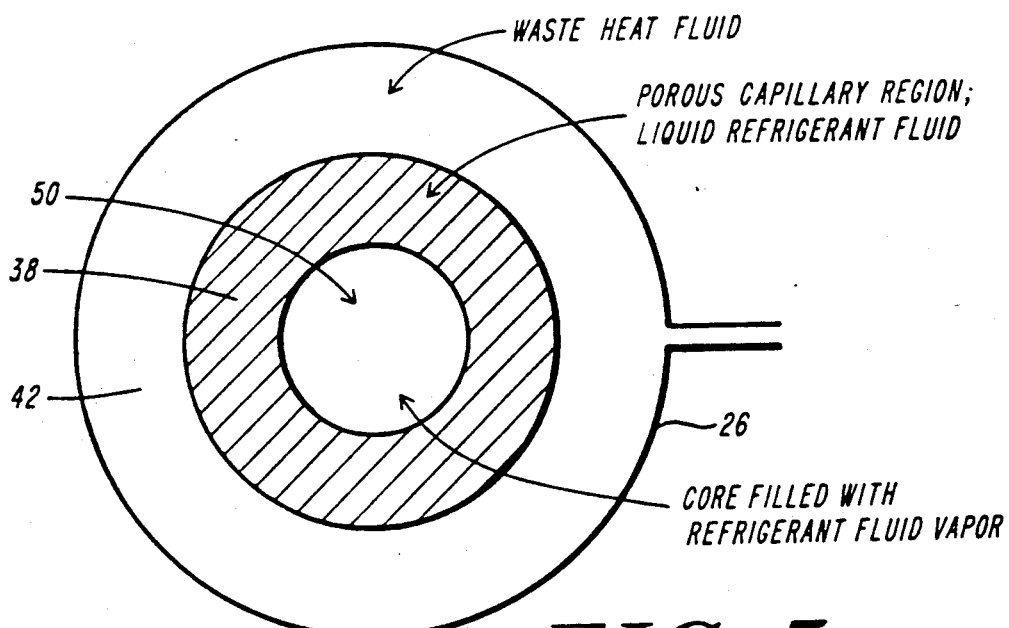
FIG. 5 is a plan cross-sectional view of the boiler of FIG. 4.

The boiler 26 is shown more fully in FIGS. 4 and 5. Preferably, the boiler is an evaporator section of a heat pipe or tube. The liquid refrigerant coming from the pump 24 enters a porous capillary region 38, through which the flow of the liquid along the boiler tube is due to capillary action. Surrounding the region 38 is a jacket 42 in the form of a coil winding around the region 38. Hot waste fluid from the engine enters the jacket 42 through a conduit 44, circulates through the jacket 38, and exits through a conduit 46. The hot waste fluid in the jacket causes the refrigerant liquid to evaporate, which enters the core region 50 of the boiler tube as a saturated vapor. The velocity of the vapor increases with distance along the boiler tube, since vapor is continuously added to the core, which remains fixed in size. The saturated vapor leaves the core at a high velocity through exit 52 and enters the ejector 30.

In an automobile, the boiler may serve as the automobile's radiator. Additionally, or alternatively, heat from the engine coolant or exhaust gases may be used. In an alternative embodiment of the boiler design, the boiler may be constructed from a series of tubes arranged in parallel. This arrangement increases the amount of surface area for heat transfer relative to the core region volume, which allows an increased heat flux.

Figure 2:
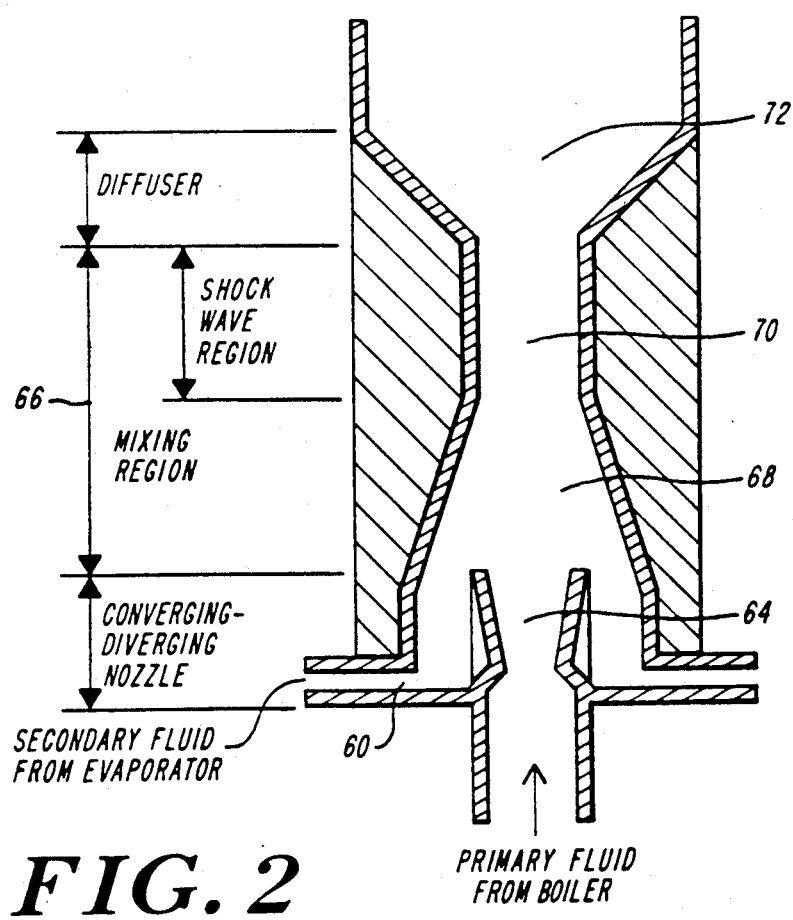
FIG. 2 is a schematic diagram of an ejector for use in the present invention.

The ejector 30 is shown more fully in FIG. 2. The vapor from the boiler, known as the primary refrigerant, enters the ejector through a conduit 62 which leads into a converging-diverging nozzle 64. The liquid refrigerant from the evaporator, known as the secondary refrigerant, enters the ejector through an annular opening 60 which surrounds the converging-diverging nozzle 64. In the ejector, the enthalpy of the primary fluid is converted into kinetic energy which is used to increase the pressure of the entrained secondary fluid.

Immediately following the nozzle 64 is a mixing region 66 in which the secondary refrigerant and the primary refrigerant mix. This mixing region may be of either a constant area type or a constant pressure type. A constant pressure mixing process is illustrated in FIG. 2 and is described below. When the primary fluid enters the mixing region 66, it is traveling at a supersonic velocity and at a low pressure. The pressure at this location is equal to or slightly lower than the saturation pressure of the working fluid at the desired evaporator temperature. The mixing region comprises two sections. The first section 68 is a converging section in which the primary and secondary fluids are mixed and the secondary liquid becomes entrained within the primary vapor. The second section 70 is cylindrical and a standing shock wave is set up in this region. The pressure of the refrigerant is increased in the shock wave region. Following the shock wave region 70 is the diffuser 72, in which the pressure is further increased.

The velocity of the primary working fluid entering the ejector should be near its sonic velocity to maximize the stagnation enthalpy. Preferably, the Mach number of the working fluid should be greater than 0.9. This yields the maximum compression in the ejector per unit of heat input to the boiler. The required temperature of the heat source is minimized by having a saturated vapor enter the ejector.

To avoid condensing the primary fluid as it travels through the converging-diverging nozzle, the fluid should be one whose entropy of a saturated vapor decreases as the pressure decreases. Several hydrocarbons exhibit such behavior. Suitable fluids include isopentane, butane, pentane, heptane, hexane, isobutane, octane, Refrigerant 114, and Refrigerant C-318.

Figure 3:
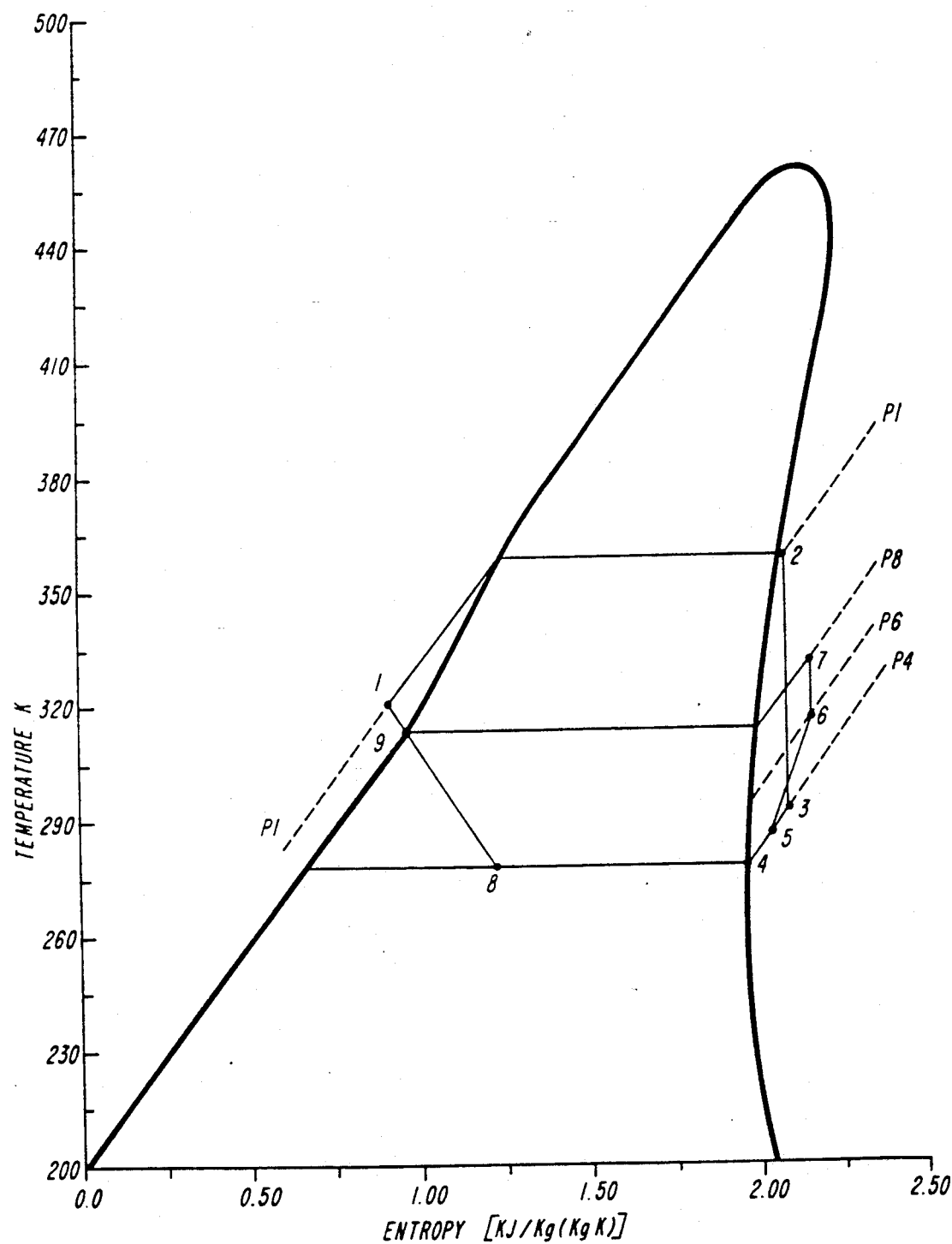
FIG. 3 is a temperature-entropy process diagram for the present invention with isopentane as the working fluid.

FIG. 3 is a temperature-entropy process diagram for isopentane. At state 1, the liquid on path 16 enters the boiler. It follows the line from state 1 to state 2 through the boiler. At state 2 it enters the primary inlet of the ejector. State 3 is the exit of the primary nozzle 64. At state 3, the fluid is travelling at a high velocity and exits the primary inlet. The secondary fluid enters the ejector at state 4 and begins mixing with the primary fluid at state 3. State 5 is the exit of the mixing section. Between states 5 and 6, the fluid is in the shock wave region of the mixing section. At state 6, it enters the diffuser. At state 7, it exits the diffuser. The fluid changes from a vapor, state 7, to a saturated liquid, state 9, on the T-S diagram as it passes through the condenser. When the flow divides, the flow on path 18 expands and enters the evaporator at state 8. The fluid on flow path 16 enters the boiler at state 1.

Figure 6:
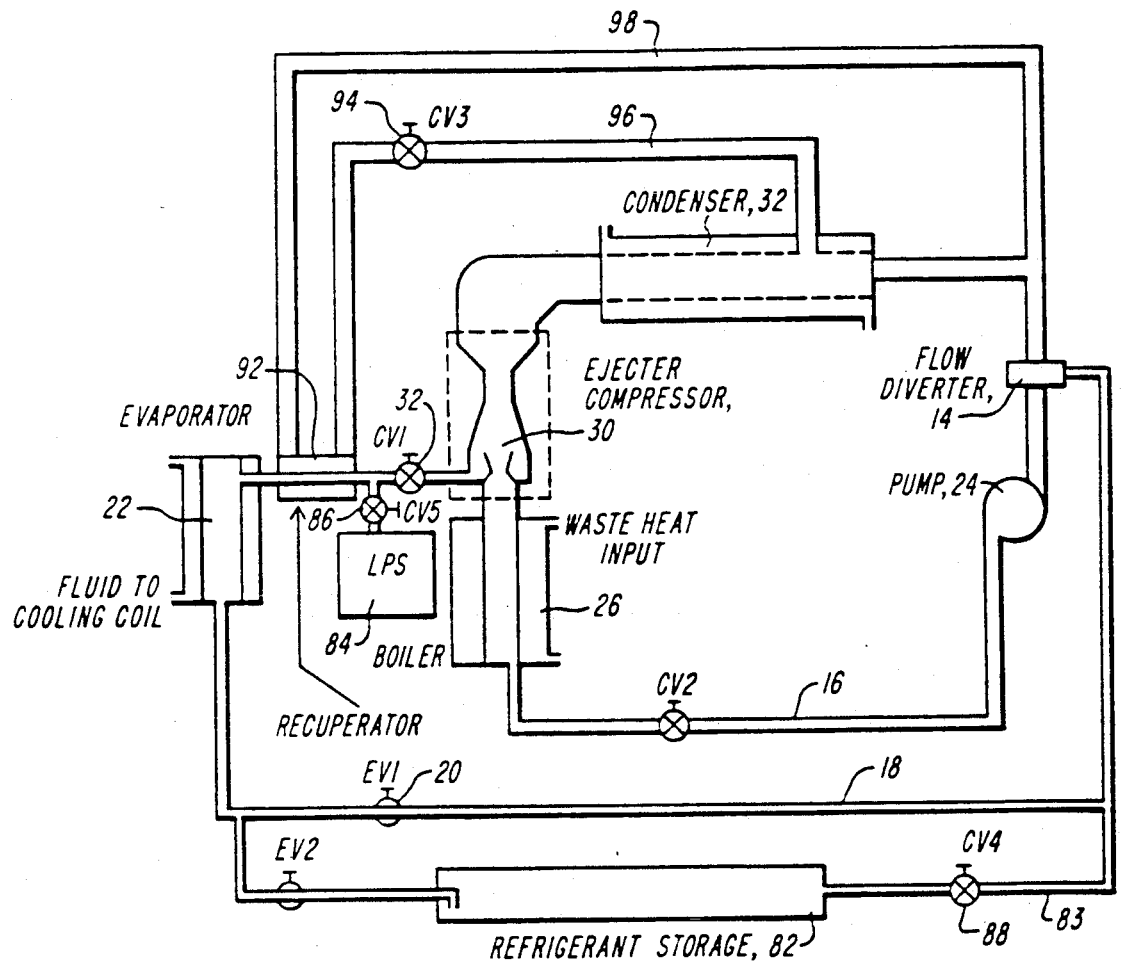
FIG. 6 is a schematic diagram of a further embodiment of the refrigeration system of the present invention.

A further embodiment of the present invention is shown in FIG. 6. This embodiment includes modifications to the system described in conjunction with FIG. 1 to improve the system's transient response characteristics and performance when using a waste heat driven ejector. The production of waste heat from an automobile engine (the flow rate of engine coolant and exhaust gases) is variable and fluctuates as a function of the engine speed. During periods such as engine warm up and idling, waste heat production is low and may not be sufficient to provide adequate cooling. During periods when the engine speed is high, waste heat production may be more than is needed for adequate cooling.

As shown in FIG. 6, a refrigerant storage system includes a high pressure storage tank 82 located in a fluid path 83 in parallel with fluid path 18 and a low pressure storage tank 84 located off the fluid path at the exit of the evaporator 22. The storage system is used during periods when the cooling load on the evaporator 22 is less than or greater than the energy being removed from the cooling fluid by the evaporating refrigerant. Under the first condition, when the cooling load is less than the energy being removed from the cooling fluid, the refrigerant flow through the evaporator 22 is reduced by opening a valve 86 connecting the low pressure tank 84 to draw stored refrigerant from the low pressure storage tank. The flow of low pressure refrigerant to the ejector 30 remains constant during this operation. A valve 88 located before the high pressure refrigerant storage tank 82 is opened to allow the high pressure tank to accumulate the excess refrigerant flow. This process continues until either storage tank is emptied or filled.

The reverse procedure is implemented during engine start up or warm-up conditions or when there is a sudden reduction in the waste heat from the engine, such as during idling of the automobile at a stop light. In this mode of operation, the flow of refrigerant from the diverter valve 14 to the evaporator 22 is insufficient to satisfy the cooling load. Accordingly, additional refrigerant flow to the evaporator 22 is supplied from the high pressure refrigerant tank 82 through expansion valve 90. To prevent the evaporator 22 from being flooded, the valve 86 to the low pressure tank is opened to collect the excess refrigerant flow from the evaporator.

Control of the refrigerant storage system may be effected automatically by, for example, a microprocessor and appropriate sensors, such as temperature sensors.

The refrigerant storage system may also be used to charge the high pressure refrigerant storage tank during the time when the engine is shut off and is still hot.

For long term storage, the temperature of the high pressure storage tank is equal to the ambient temperature and its pressure is less than the design pressure of the condenser. A concentric tank design may be provided in which an inner tank is used for the high pressure refrigerant storage and outer tank is used for the low pressure refrigerant storage. With this configuration, heat transfer occurs between the high and low pressure tanks. This heat transfer may be used to maximize the pressure and amount of fluid stored in the high pressure tank when it is being charged. This configuration also provides the minimum operating pressure in the lower pressure storage tank while the refrigeration system is operated from the storage system.

A recuperator 92 may also be included in the system. The fluid from the condenser 32 travels through control valve 94 on flow path 96 to the recuperator 92. The recuperator is located on the flow path after the exit from the evaporator 22. Fluid is returned from the recuperator on flow path 98 to the diverter 14. The recuperator is a heat exchanger which allows some of the energy from the condensing process to be used to heat the refrigerant flow from the evaporator 22 to increase its temperature and velocity upon entering the ejector 30. This increase in temperature and velocity of the secondary flow enables the primary flow to be reduced through the ejector while maintaining the same discharge pressure to the condenser. Thus, the system is able to compress a larger amount of secondary refrigerant per unit of heat input to the system.

The present refrigeration system can be manufactured as a hermetically sealed unit and integrated with the existing connections to the heating, ventilating, and cooling system of an automobile to form the air conditioning system of the automobile, either when the automobile is initially manufactured or as a retrofit to an existing automobile. The retrofit may also be a replacement of an existing CFC-based air conditioner. The present invention has fewer moving parts than prior art vapor compression air conditioning systems typically used in automobiles and, accordingly, is more reliable than existing systems. In addition, by using automobile engine waste heat, fuel economy of the vehicle is increased. A valve may also be provided to bypass the air conditioning system and direct the waste heat to the passenger compartment when necessary for heating. The present refrigeration system may also be sized for use in refrigerated surface transportation, such as refrigerated trucks or city buses, and has potential applications in cogeneration and solar energy systems.

Suitable connections may be provided for the engine coolant water and the exhaust gases and a set of coolant connections to carry the cold working fluid, such as a water-ethylene glycol mixture, to the environmental control system of the automobile. Heat pipes may be provided to transfer the energy from the engine coolant and exhaust systems to the boiler and from the evaporator to the cold working fluid. This type of packaging provides a double wall type of protection to prevent accidental discharge of the refrigerant fluid during an automobile accident.

The invention is not to be limited by what has been particularly shown and described, except as indicated in the appended claims.

We claim:

1. An air conditioning system for an automobile comprising:
   a working fluid;
   a condenser for condensing the working fluid to a saturated liquid;
   a diverter located at the exit of the condenser for diverting the fluid into a first flow path and a second flow path;
   a boiler located in the first flow path for boiling the working fluid to produce a high velocity saturated vapor;
   means for supplying waste heat to the boiler from an engine of the automobile;
   an expansion valve located in the second flow path for decreasing the pressure of the working fluid;
   an evaporator located in the second flow path after the expansion valve for evaporating the working fluid;
   an ejector located at a junction of the first and second flow paths for mixing the high velocity saturated vapor from the boiler with the working fluid from the evaporator and for returning the working fluid at an increased pressure to the condenser; and
   means for compensating for effects of fluctuations in waste heat output from the engine, comprising a high pressure storage tank for storing the working fluid located in a flow path in parallel with the second flow path, and a low pressure storage tank for storing the working fluid located between the exit of the evaporator and the entrance of the ejector.

2. The air conditioning system of claim 1, wherein the compensating means further comprising means for reducing flow through the evaporator when the cooling load on the evaporator is less than the energy being removed by the working fluid by directing the working fluid to the low pressure storage tank and accumulating excess fluid in the high pressure storage tank and for increasing flow through the evaporator when the cooling load on the evaporator is greater than the energy being removed by the working fluid by supplying fluid from the high pressure storage tank to the evaporator and withdrawing fluid from the low pressure storage tank.

3. The air conditioning system of claim 1, further comprising a recuperator located at the exit of the evaporator and piping to direct the working fluid from the condenser to the recuperator and return the working fluid to the diverter to heat the working fluid from the evaporator prior to entering the ejector.

* * * * *